US011593235B2

(12) United States Patent
Jayaram et al.

(10) Patent No.: US 11,593,235 B2
(45) Date of Patent: Feb. 28, 2023

(54) APPLICATION-SPECIFIC POLICIES FOR FAILOVER FROM AN EDGE SITE TO A CLOUD

(71) Applicant: Hewlett Packard Enterprise Development LP, Houston, TX (US)

(72) Inventors: Smitha Jayaram, Bangalore Karnataka (IN); Manoj Thankappan Varadamma, Bangalore Karnataka (IN); Srinivas Krishnappa Shapur, Bangalore Karnataka (IN); Nagaraju K N, Bangalore Karnataka (IN); Vijay Ballal, Bangalore Karnataka (IN); Suhas Shivanna, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 368 days.

(21) Appl. No.: 16/786,853

(22) Filed: Feb. 10, 2020

(65) Prior Publication Data

US 2021/0248047 A1 Aug. 12, 2021

(51) Int. Cl.
*G06F 11/20* (2006.01)
*G06F 9/455* (2018.01)

(52) U.S. Cl.
CPC ...... *G06F 11/2033* (2013.01); *G06F 9/45558* (2013.01); *G06F 2201/815* (2013.01)

(58) Field of Classification Search
CPC ............ G06F 11/2033; G06F 9/45558; G06F 2201/815
See application file for complete search history.

(56) References Cited

U.S. PATENT DOCUMENTS 7,900,206 B1 * 3/2011 Joshi ................. G06F 11/2035
714/48
9,063,822 B2 6/2015 Valiyaparambil et al.
(Continued)

OTHER PUBLICATIONS

Joab Jackson, "Mesosphere 1.11 Focuses on Edge Computing, Multicloud and Disaster Recovery," Mar. 8, 2018, pp. 1-10, The New Stack, Retrieved from the Internet on Apr. 26, 2019 at URL: <thenewstack.io/mesosphere-1-11-focuses-edge-computing-disaster-recovery/>.

(Continued)

*Primary Examiner* — Joseph O Schell
(74) *Attorney, Agent, or Firm* — Mauriel Kapouytian Woods LLP

(57) ABSTRACT

Example implementations relate to application-specific policies for failing over from an edge site to a cloud. When an application becomes operational within an edge site, a discovery phase is performed by a local disaster recovery (DR) agent. I/O associated with a workload of the application is monitored. An I/O rate for data replication that satisfies latency characteristics of the application is predicted based on the incoming I/O. Based on results of tests against multiple clouds indicative of their respective RTO/RPO values, information regarding a selected cloud to serve as a secondary system is stored in an application-specific policy. The application-specific policy is transferred to a remote DR agent running in the selected cloud. Responsive to a failover event, infrastructure within a virtualized environment of the selected cloud is enabled to support a failover workload for the application based on the application-specific policy.

17 Claims, 9 Drawing Sheets

(56) References Cited

U.S. PATENT DOCUMENTS

| | | | |
|---|---|---|---|
| 9,582,379 B2 | 2/2017 | Banerjee et al. | |
| 9,658,874 B2* | 5/2017 | Ashok | H04L 67/1008 |
| 9,836,363 B2* | 12/2017 | Nosov | H04L 69/40 |
| 2008/0177963 A1* | 7/2008 | Rogers | H04L 47/10 |
| | | | 711/E12.103 |
| 2010/0228819 A1 | 9/2010 | Wei | |
| 2013/0318221 A1* | 11/2013 | Anaya | H04L 67/101 |
| | | | 709/223 |
| 2015/0142747 A1* | 5/2015 | Zou | G06F 11/1464 |
| | | | 707/649 |
| 2015/0363276 A1* | 12/2015 | Banerjee | G06F 11/203 |
| | | | 714/4.11 |
| 2016/0048408 A1* | 2/2016 | Madhu | H04L 47/783 |
| | | | 718/1 |
| 2016/0092266 A1* | 3/2016 | Bavishi | G06F 9/52 |
| | | | 718/1 |
| 2016/0162378 A1* | 6/2016 | Garlapati | G06F 11/2038 |
| | | | 714/4.12 |
| 2016/0170793 A1* | 6/2016 | Decusatis | H04L 67/10 |
| | | | 718/1 |
| 2016/0277509 A1* | 9/2016 | Qiang | H04L 67/1001 |
| 2017/0199770 A1* | 7/2017 | Peteva | G06F 9/5088 |
| 2020/0007620 A1* | 1/2020 | Das | H04L 67/62 |

OTHER PUBLICATIONS

Mike Chan, "How Edge Computing and the Cloud Will Power the Future of IOT," Nov. 12, 2017, pp. 1-12, Cloud Tweaks, Retrieved from the Internet on Apr. 26, 2019 at URL: <cloudtweaks.com/2017/12/edge-computing-cioud-will-power-future-iot/>.

Zia Saquib et al., "A New Approach to Disaster Recovery as a Service Over Cloud for Database System," Conference Paper, Jan. 2013, pp. 1-7, Centre for Development of Advanced Computing Mumbai India.

\* cited by examiner

APPLICATION-SPECIFIC POLICIES FOR FAILOVER FROM AN EDGE SITE TO A CLOUD

BACKGROUND

As businesses attempt to better address the needs of cloud customers and with advances in edge computing, compute functionality is drifting towards the data generation site. This in turn increases the importance of business critical applications that may be running at edge sites as well as the data generated at the edge sites, as such data now carries more business relevance than before. Meanwhile, edge sites may represent harsh and/or hostile environments for Information Technology (IT) infrastructure thereby increasing the likelihood of failures.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
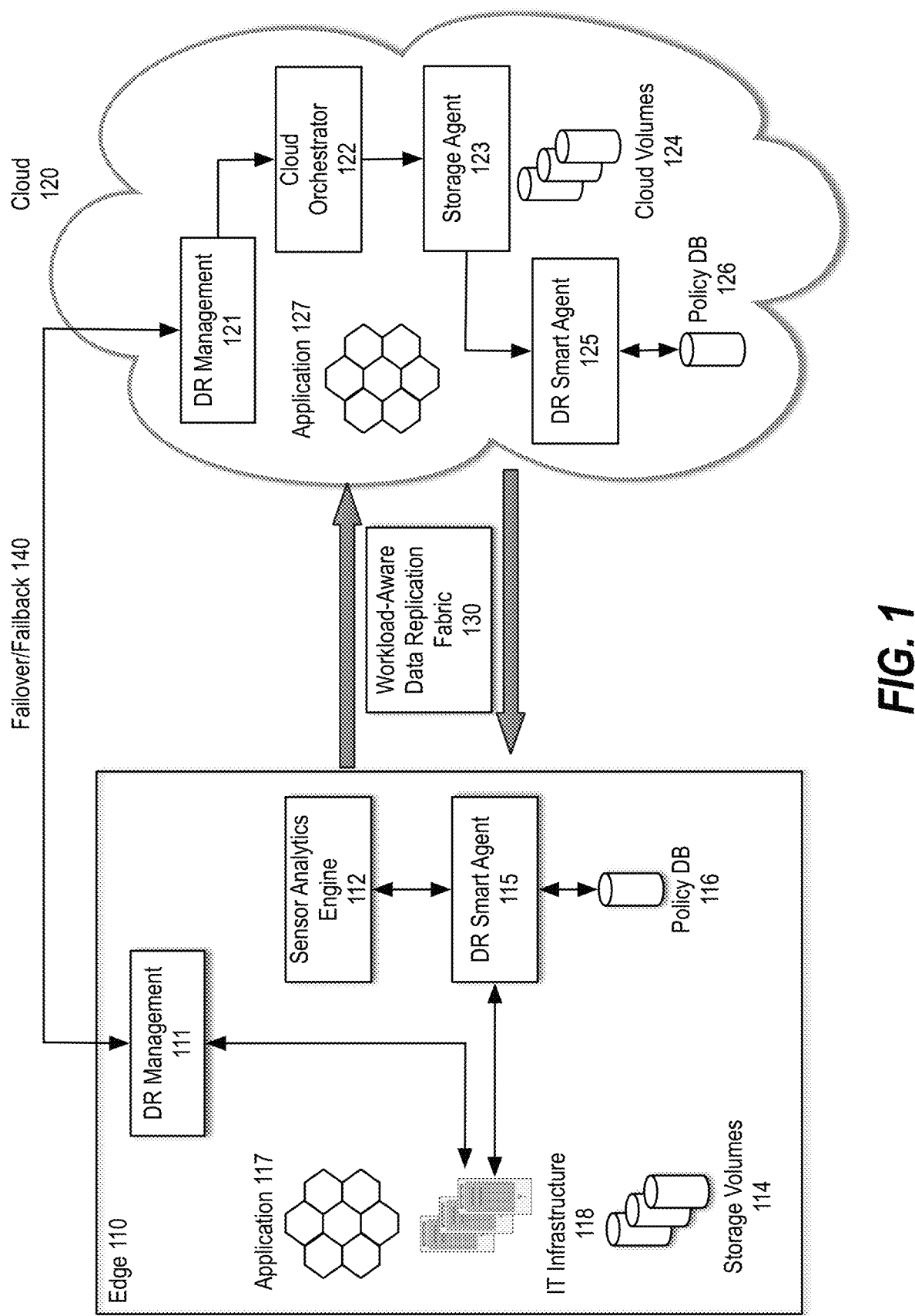
FIG. 1 is a block diagram conceptually illustrating a workload-aware disaster recovery (DR) system in accordance with an example embodiment.

Embodiments described herein are generally directed to a workload-aware disaster recovery (DR) solution for failing over from an edge site to a cloud. In the following description, numerous specific details are set forth in order to provide a thorough understanding of example embodiments. It will be apparent, however, to one skilled in the art that embodiments described herein may be practiced without some of these specific details.

The factors noted above in the Background, among other factors, are driving the need for a DR solution at the edge. Existing DR solutions may be designed around on-premise infrastructure and are not sensitive to edge needs. Also, an Edge data center can range from servers stacked in an entire rack to a two node or single node deployments. Additionally, some edge infrastructures run specialized applications focusing on a single pointed use case, while others run diversified workloads like Tier 1 business applications, data flow applications, machine-learning (ML) modelling systems and/or predictive analytics. As those skilled in the art will appreciate, the DR needs of each of these deployments vary, arguing against a one-size-fits-all solution.

Embodiments of the present invention seek to provide a dynamic and flexible, cost-effective DR solution for on-premise or edge infrastructure. According to one embodiment, a novel workload-aware edge to cloud DR solution is provided in which application-specific DR policies are created in a dynamic manner, which may enable preferential failover/failback responsive to a DR event.

While various examples are described herein with reference to DR for an edge site, embodiments are equally applicable to other sites having similar characteristics as edge sites. As such, those skilled in the art will appreciate based on the disclosure contained herein that embodiments of the DR system can support DR for edge sites, on-premise and other similarly situated collections of IT infrastructure.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein "edge site" or simply "edge" generally refers to the geographic proximity to local end users of a cloud and/or of the performance of one or more computing tasks to the source of the data on which the one or more computing tasks operate. As such, an edge deployment is not necessarily defined by the size of the facility or amount of hardware, but rather may be defined by the site's proximity to end-users or the source of the data to be processed. In embodiments described herein, instead of relying on the cloud at one of a number of data centers to do all the work, the edge data center (the edge site) that serves as the source of the data at issue, is geographically proximate to the source of the data at issue, or is proximate to the local end users may take responsibility for performing some portion of the work. Non-limiting examples of edge sites include on-premise data centers or data centers positioned in growing markets or on the outskirts of existing networks (extending the "edge" of the Internet further from traditional Internet hubs) that allow companies to deliver content or services to local users with minimal latency.

As used herein an "application profile" or simply a "profile" generally refers to information associated with a particular application that facilitates performance of backup or disaster recovery (DR) for the particular application. According to one embodiment, the information associated with an application profile includes information regarding virtual machine (VM) properties of the VM(s) or container properties on which the application runs in the primary site (e.g., the edge site), volume properties of the storage volumes utilized by the application in the primary site, a recovery time objective (RTO) of the application, a recovery point objective (RPO) of the application, dependent applications, DR properties, volume properties of the cloud volumes in the secondary site.

FIG. 1 is a block diagram conceptually illustrating a workload-aware disaster recovery (DR) system 100 in accordance with an embodiment. In the context of the present example, the DR system 100 involves an edge 110 and a cloud 120 (e.g. a public cloud, a private cloud or hybrid cloud). The edge 110 includes a DR management agent 111, an application 117, IT infrastructure 118, storage volumes 114, a sensor analytics engine 112, a DR smart agent, and a policy database 116. The cloud 120 includes a DR management agent 121, an application 127, a cloud orchestrator 122, a storage agent 123, cloud volumes 124, a DR smart agent 125, and a policy database 126. The various agents and engines described herein may be implemented in hardware or combination of hardware and programming.

Due to the physical advantages resulting from the proximity of edge devices improving real-time data analytics and lowering the barriers-of-entry for on-premise hardware used in real-time applications, non-limiting examples of the types of applications that are thriving at the edge include applications involving gaming, machine learning, facial recognition algorithms, augmented reality (AR), and virtual reality (VR) However, it is expected that other types of applications (including presentation layer functionality, data replication as well as back-end business logic) may be offloaded from within enterprise networks and application hosters to the edge.

Given the flexible and extensible nature of the DR solution described herein and the countless examples of applications that may run at the edge, the particular functionality or type of application represented by the application 117 is not of consequence herein and the application 117 will simply be discussed as a virtualized application (e.g., a virtual machine (VM)-based application or a container-based application) running on IT infrastructure 118 (e.g., providing a VM-based environment or a container-based environment).

According to one embodiment, the IT infrastructure 118 represents virtualized IT infrastructure. For example, the IT infrastructure 118 may be software-defined IT infrastructure in the form of hyper-converged infrastructure (HCI) that provides one or more of virtualized computing (e.g., a hypervisor), a virtual storage area network (SAN) (e.g., software-defined storage) and virtualized networking (e.g., software-defined networking), running on commercial off-the-shelf (COTS) servers.

Depending upon the particular implementation and the nature of the application 117, storage volumes 114 may represent one or more of a variety of types of storage devices and/or services (e.g., block storage, object storage, and container storage) that persist data generated by the application 117 or otherwise used by the application 117.

In the context of the present example, the DR smart agent 115 is responsible for analyzing the incoming Input/Output (I/O) (incoming requests) to the application 117 and creating an application-specific DR policy (not shown) that is persisted in the policy database 116. According to one embodiment, the DR smart agent 115 is layered below the application 117 and above the storage system, thereby allowing the DR smart agent 115 to monitor reads and writes from the application 117. DR smart agent 115 or 125 may also be responsible for triggering a failover or failback of the applications (e.g., application 117), based on their respective application-specific DR policies. For example, the DR smart agent 125 may work in conjunction with the sensor analytics engine 112 and the DR Management agent 121 to initiate voluntary failover when applicable.

According to one embodiment, the DR smart agents 115 and 125 are software-defined modules that are deployed in the edge 110 as well as the remote secondary site (e.g., the cloud 120 in this case), respectively. As described in further detail below, the DR smart agent 115 monitors the workload pattern of the application 117 and examines the recovery time objective (RTO) and/or recovery point objective (RPO) requirements of the application 117 to create the application-specific DR policy for the application 117.

In one embodiment, the DR smart agent 125 is responsible for triggering a failover for a specific application in accordance with the corresponding application-specific policy defined in the policy database 126. As described in further detail below, the DR smart agent 125 may adhere to the RTO and RPO requirements specified for a given application, for example, by bringing up the infrastructure in the cloud 120 to support the application 127 in a cold, warm or hot state. The DR smart agent 125 may also perform DR for a solution/workload as a whole (e.g., an application and its dependent applications), rather than looking at an application as a discrete independent unit. The DR smart agent 115 in the edge 110 may at times be referred to herein as the local DR smart agent and the DR smart agent 125 in the cloud 120 may at times be referred to herein as the remote DR smart agent.

In the context of the present example, policy database 116 stores the application topology of applications (e.g., application 117) running at the edge 110 as well as application-specific policy information for each of the applications. In one embodiment, the policy database 116 persists a number of policy entries that may be retrieved based on an associated application identifier (ID). A non-limiting set of policy entries that may be maintained for each application includes one or more of (i) an application profile, (ii) a backup policy, (iii) a retention period, (iv) a data encryption policy, (v) RTO, (vi) RPO, (vii) a data transfer rate, (viii) a write coalescing policy, (ix) volume tags, and (x) DR target details (e.g., the cloud provider, the Internet Protocol (IP) address of the cloud provider, and the like). In one embodiment, the policy database 116 is replicated to the cloud 120 in the form of policy database 126. In this manner, the same set of policy information is available for reference in both the edge 110 and the cloud 120.

According to one embodiment, an optional sensor analytics engine 112 may be provided to receive data from one or more sensors, such as a sensor for a physical phenomenon, (e.g., smoke sensors, heat sensors, earthquake sensors, water sensors, and the like) within the edge 110 that may be indicative of an imminent disaster relating to the edge 110. In one embodiment, the DR smart agent 125 may expose application programming interfaces (APIs) that may be invoked by the sensor analytics engine 112 responsive to prediction of a disaster based on the data from the physical sensors by the sensor analytics engine. In the context of the present example, such a prediction may prompt the DR smart agent 115 or 125 to trigger a failover 140 from the edge 110 to the cloud 120.

In embodiments, the DR management agents 111 and 121 are responsible for actual failover and failback 140 orchestration. The DR management agent 111 in the edge 110 may at times be referred to herein as the local DR management agent and the DR management agent 121 in the cloud 120 may at times be referred to herein as the remote DR management agent.

In the context of the present example, the edge 110 is coupled to the cloud 120 via a workload-aware data replication fabric 130. According to one embodiment, the workload-aware data replication fabric 130 serves as a channel for data movement and is controlled by the DR smart agents 115 and 125. In one embodiment, the workload-aware data replication fabric 130 is a software defined wide area network (WAN) layer that is responsible for moving data between the edge 110 and the cloud 120.

In one embodiment, the cloud orchestrator 122 is responsible for bringing up the infrastructure, which involves, for example, the selection of hardware resources, network, storage, operating system and various dependent resources, components as required by the application 127. For example, the cloud orchestrator 122 may stitching these resources together in a fashion that is appropriate for the application 127. In one embodiment, information to facilitate processing by the cloud orchestrator 122 is gathered as part of a discovery phase described in further detail below and stored in the policy database 116.

A cloud DR plugin (not shown) may also be provided within the cloud 120. According to one embodiment, the cloud DR plugin is cloud vendor specific and is responsible for invoking the cloud vendor specific orchestration interfaces to facilitate failover/failback. The cloud DR plugin may run as a VM in the cloud vendor environment. For example, if Amazon Web Services (AWS) is chosen as the DR target for a specific application, then the cloud DR plugin module will run in AWS and enable the bringing up of the application VMs in AWS.

In the context of the present example, application 127 represents an instance of application 117 that is created and activated within the cloud 120 responsive to a failover event.

In one embodiment, the storage agent 123 is responsible for making use of data stores presented by the cloud 120 to create one or more cloud volumes 124 for storing data relied upon by applications (e.g., application 117) that is replicated from the storage volumes 114. In an embodiment in which the IT infrastructure 118 in in the form of HCI, the storage agent 128 may represent a light weight HCI software stack. According to one embodiment, the storage agent 123 is deployed in a VM in the DR target environment (e.g., the cloud 120) and facilitates access to data from the cloud volumes 124 post failover.

While for sake of brevity only one application and one secondary site (e.g., cloud 120) are shown and described in the context of FIG. 1, those skilled in the art will appreciate multiple applications may be running in the edge 110 and a secondary site of multiple candidate secondary sites may be independently selected for each application. In embodiments, application dependency and affinity may be analyzed as part of a discovery phase described below to failover a workload/solution as a single group/entity.

The processing described below with reference to the flow diagrams of FIGS. 2-8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 9 below.

While for sake of brevity, certain actions may be described with reference to the flow diagrams of FIGS. 2-8 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 2:
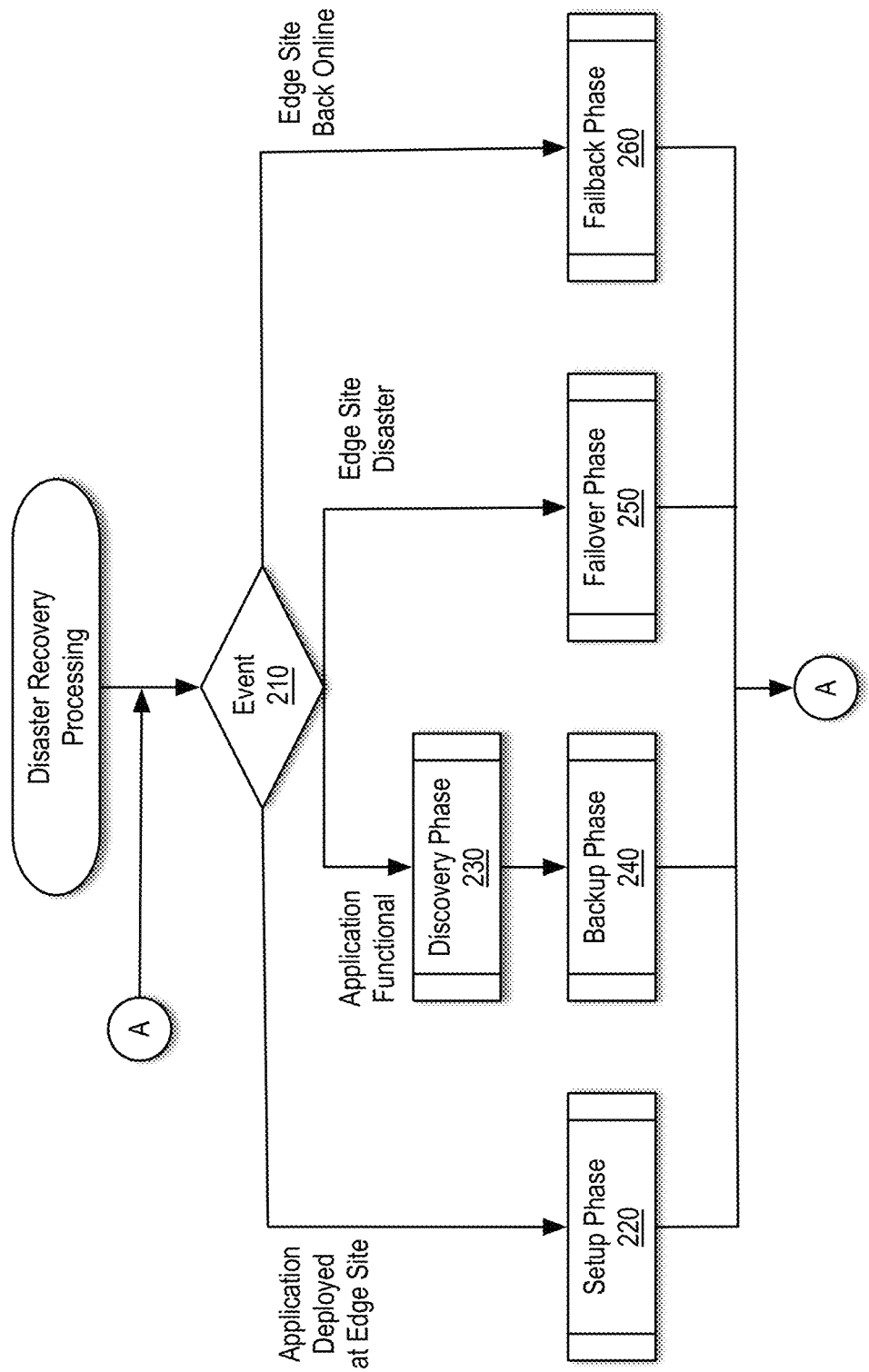
FIG. 2 is a high-level flow diagram illustrating high-level DR processing in accordance with an example embodiment.

FIG. 2 is a high-level flow diagram illustrating high-level DR processing in accordance with an embodiment. In the context of the present example, DR processing starts at decision block 210, in which an event that triggered the DR processing is evaluated. When the event relates to an application (e.g., application 117) being deployed at the edge site (e.g., edge 110), then processing continues with block 220. When the event relates to an application at the edge site becoming functional, then processing continues with block 230. When the event relates to an edge site disaster (e.g., as detected by an automated process or as indicated manually by a user), then processing continues with block 250. When the event relates to the edge site having come back online, then processing continues with block 260. For example, the remote smart DR agent may continuously monitor the applications running at the edge site against various factors, e.g., indicative of the application being run, responsiveness of the application, periodic activities being directed to the application and the like. Collectively, these various factors can be used as an indication of the health of a particular application to understand whether the application is functional or not.

At block 220, a setup phase is performed. According to one embodiment, responsive to deployment of the application at the edge site, information regarding the application is captured and recorded, the application and volumes (e.g., storage volumes 114) used by the application are tagged, policy information relating to the application is established and persisted in a policy database (e.g., policy database 116), and various components of the DR system (e.g., DR system 100) are setup. A non-limiting example of setup phase processing is described further below with reference to FIG. 4.

At block 230, a discovery phase is performed. According to one embodiment, when then application has become functional, a local DR smart agent (e.g., DR smart agent 115) starts monitoring the application to understand latency constraints associated with the application to identify data replication parameters to be used during a backup phase and/or a failover phase. The local DR smart agent may also determine and record various policy information in the policy database 116 for the application. A non-limiting example of discovery phase processing is described further below with reference to FIG. 5.

At block 240, a backup phase is performed. According to one embodiment, after the discovery phase has been completed, data associated with the application is periodically backed up to a selected secondary site (e.g., cloud 120) in accordance with a backup policy established for the application during the discovery phase. A non-limiting example of backup phase processing is described further below with reference to FIG. 6.

At block 250, a failover phase is performed. According to one embodiment, responsive to a failover event (e.g., detection that the edge site has gone offline, has experienced a disaster event or is otherwise unavailable by automated means or as manually requested by an IT administrator), a set of predefined workload recovery actions are initiated, including bringing up an instance of the application (e.g., application 127) in the selected secondary site to handle user requests while the edge site is unavailable. A non-limiting example of failover phase processing is described further below with reference to FIG. 7.

At block 260, a failback phase is performed. According to one embodiment, responsive to receiving an indication that the edge site is back online, the application is brought back up at the primary site. A non-limiting example of failback phase processing is described further below with reference to FIG. 8.

Figure 3:
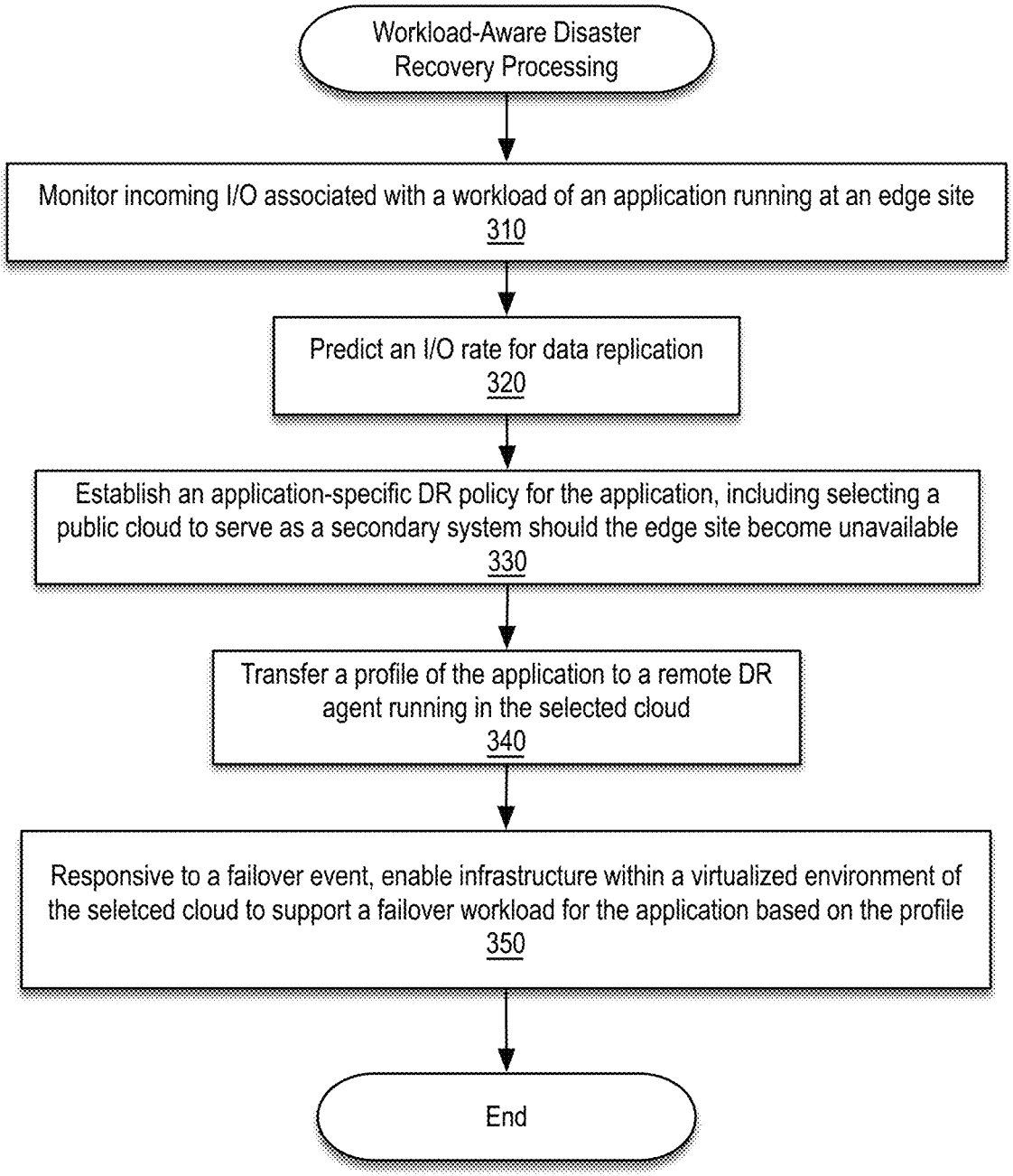
FIG. 3 is a flow diagram illustrating workload-aware DR processing in accordance with an example embodiment.

FIG. 3 is a flow diagram illustrating workload-aware DR processing in accordance with an embodiment. Before describing various examples of processing performed during the setup phase, discovery phase, backup phase, failover phase, and failback phase, a brief summary of a subset of DR processing in accordance with an embodiment is now provided. At block 310, incoming I/O associated with a workload of an application (e.g., application 117) is monitored. Depending upon the particular implementation, the incoming I/O may include interactions between end users and the application and interactions among the workload of the application and the IT infrastructure (e.g., IT infrastructure 118) and the storage volumes (e.g., storage volumes 114) used by the application. I/O may be measured as IOPS (Input/Output Operations Per Second), for example.

At block 320, an I/O rate for data replication is predicted. According to one embodiment, this involves performing an I/O pattern analysis on the observed incoming I/O over a period of time to determine a steady state I/O rate (e.g., average I/O rate) to be maintained for data replication to the selected secondary site (e.g., the cloud 120). In one embodiment, the steady state I/O rate is predicted or estimated in a manner so as to meet the perceived needs of the overall latency requirements of the application. For example, a transaction log may tolerate less latency than a backup log. In one embodiment, the snooping of I/Os during the discovery phase allows the DR system to distinguish between applications that periodically perform large-sized writes in a sequential manner and applications that are more transactional in nature (e.g., characterized by high throughput (e.g., in transactions per second), a mix of smaller-sized reads and writes, and the like). In some embodiments, the discovery phase may be periodically re-run (e.g., daily or weekly) and/or may be re-run when there is a change (e.g., in RPO or in available cloud providers).

At block 330, an application-specific DR policy is established for the application, including selecting a cloud (e.g., cloud 120) to serve as a secondary system should the edge site (e.g., edge 110) become unavailable. In one embodiment, the secondary system is selected from among available candidate clouds and various parameters associated with the application-specific DR policy are established based on one or more tests (e.g., a latency test, a download speed test, and an upload speed test) and values of parameters specified by a service level agreement (SLA) associated with the application.

At block 340, a profile of the application is transferred to a remote DR smart agent (e.g., DR smart agent 125) running in the selected secondary site. Depending upon the particular embodiment, the application profile may be part of the policy information stored in policy database (e.g., policy database 116) or may be included within a separate data store. The application profile may include information regarding one or more of VM properties, container properties, storage volume properties, desired and possible (e.g., achievable with the selected secondary site) RTO, desired and possible RPO, dependent applications, DR properties, and cloud volume properties. A non-limiting example of information that may be contained in an application profile, which, in one embodiment, may be specified in XML or an object notation format (e.g., JavaScript Object Notation (JSON)), is provided below:

Application UUID→Unique Application Identifier
Virtual Machine Properties {
    Name
    OS
    CPU
    Memory
    Storage
    Network
},
Volume Properties {
    UUID
    Replication Required
    Encryption
},
RTO {
    Required,→Specifies required RTO for the workload
    Possible→Indicates the discovered RTO
},
RPO {
    Required,→Specifies required RPO for the workload
    Possible→Indicates the discovered RPO
},
Dependent Applications {
    Array of UUIDs
},
DR Properties {
    Best fit DR Destination→Deduced after Discovery
},
Volume Properties in DR Cloud {
    UUID→Replicated Volume Identifiers in Cloud.
}

At block 350, responsive to a failover event, virtual infrastructure within a virtualized environment (e.g., a VM-based environment or a container-based environment) of the selected cloud is enabled to support a failover workload for the application based on the application profile.

Figure 4:
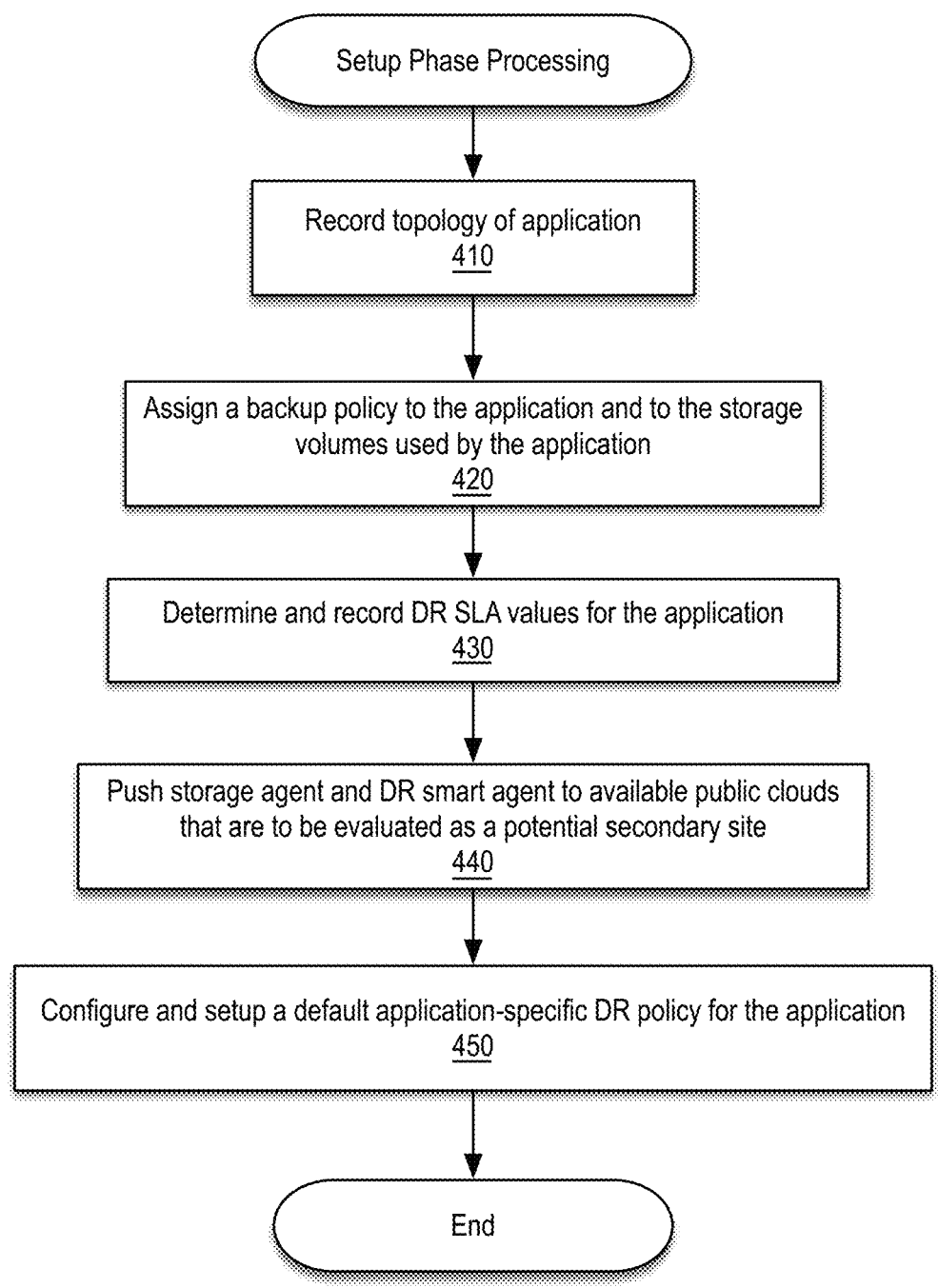
FIG. 4 is a flow diagram illustrating setup phase processing in accordance with an example embodiment.

FIG. 4 is a flow diagram illustrating setup phase processing in accordance with an embodiment. According to one embodiment, one or more portions of the setup phase processing is performed by a local DR smart agent (e.g., DR smart agent 115) running within the primary site (e.g., edge 110). At block 410, the topology of the application (e.g., application 117) is recorded. According to one embodiment, the local DR smart agent determines the topology of the application and records the topology in a local policy database (e.g., policy database 116) within the primary site. Depending upon the particular implementation, the topology may be provided as an input by an administrator during the setup phase, for example, or the topology may be programmatically discovered.

At block 420, a backup policy is assigned to the application and to the storage volumes (e.g., storage volumes 114) used by the application. According to one embodiment, the local DR smart agent creates a universally unique identifier (UUID) for the application and records information regarding the VMs (or containers) and volumes used by the application. Each volume used by the application may be given a unique tag including some combination of the application UUID and a UUID of the volume. For example, the unique tag may be formed by concatenating the application UUID and the volume UUID. In one embodiment, the backup policy may be configured and set up for the application based on the application type, latency constraints and other information learned during the discovery phase, and input received from an IT administrator. Identification of candidate secondary sites (e.g., Public Cloud end point providers) may also be performed at this time based on information input from an IT administrator and/or based on configuration information (e.g., a configuration file).

At block 430, DR and SLA values for the application are determined and recorded. According to one embodiment, RTO and RPO values associated with the application and the application topology with its dependencies are recorded within the policy database. Depending upon the particular implementation, the topology and/or the RTO/RPO values may be provided as an input by an administrator during the setup phase, for example, or may be programmatically determined.

At block 440, an instance of a remote storage agent (e.g., storage agent 123) and a remote DR smart agent (e.g., DR smart agent 125) may be pushed to the candidate secondary sites. In embodiments, the local and remote DR smart agents communicate with each other to identify a candidate secondary site that represents the right fit (e.g., for backup, failover, failback, RPO, RTO, etc.) for the application.

At block 450, a default DR policy is initially assigned to the application. According to one embodiment, the default DR policy may be subsequently tailored for the application to make it application specific by revising the default DR policy in accordance with appropriate parameters learned for the workload during the discovery phase. According to one embodiment, the DR policy for the application may be mapped to each of the volume tags associated with the application. As noted above, in one embodiment, each volume used by the application may be given a unique tag. For example, the unique tag may include some combination of the application UUID and a UUID of the volume.

Figure 5:
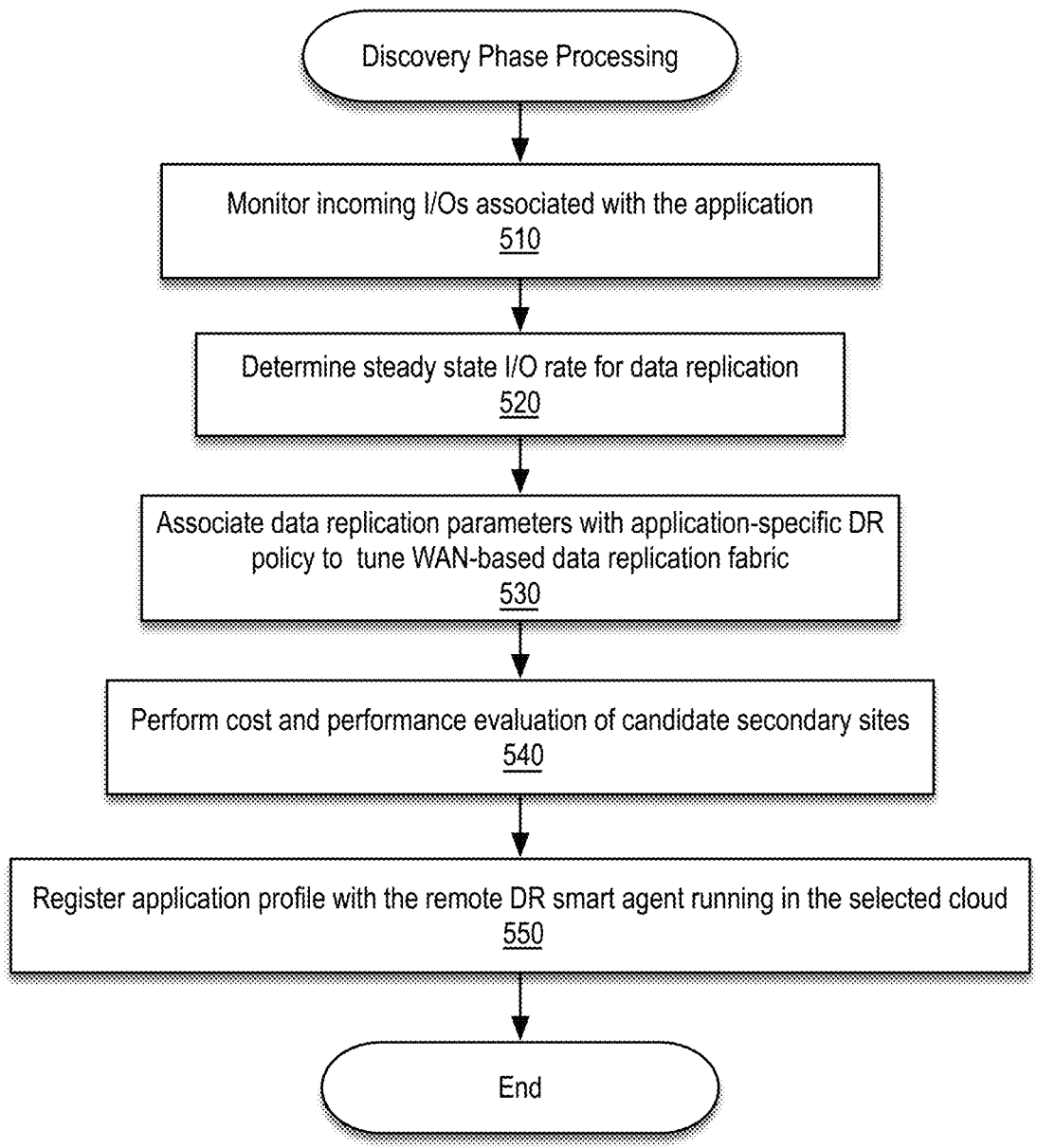
FIG. 5 is a flow diagram illustrating discovery phase processing in accordance with an example embodiment.

FIG. 5 is a flow diagram illustrating discovery phase processing in accordance with an embodiment. According to one embodiment, one or more portions of the discovery phase processing is performed by a local DR smart agent (e.g., DR smart agent 115) running within the primary site (e.g., edge 110). At block 510, incoming I/Os associated with the application are monitored. According to one embodiment, the local DR smart agent monitors I/O associated with the application and the workload of the application, including one or more of interactions between end users and the application and interactions among the workload of the application and the IT infrastructure (e.g., IT infrastructure 118) and the storage volumes (e.g., storage volumes 114) used by the application.

At block 520, a steady state I/O rate for data replication is determined. According to one embodiment, an I/O pattern analysis engine predict or estimates the steady state I/O rate that should be maintained for data replication to meet the perceived latency needs of the application. At this time, the local DR smart agent (e.g., DR smart agent 115) may also determine an optimal data replication configuration by creating the right balance between the RTO/RPO time values and the estimated/predicted steady state I/O rate. For example, smaller transactions with higher I/O rates may require higher throughput (e.g., more frequent replication of smaller data replication units) to meet a given RTO/RPO.

The information regarding the optimal data replication throughput may then be used at least in part to tune a replication fabric (e.g., workload-aware data replication fabric 130) coupling the primary site to the candidate secondary sites. Non-limiting examples of other factors that may be used to tune the replication fabric for a particular application include the nature of the data, RTO/RPO, the ability to coalesce multiple data segments, whether deduplication and/or compression can be applied, and the like. This information may also be persisted in the policy database for all volume tags associated with the VMs on which the application runs set of VMs.

Depending upon the particular implementation, other policy fields may also be set in the policy database at this time. For example, a write-coalescing size may be assigned for asynchronous I/Os, data encryption may be enabled for certain volume tags, etc.

At block 540, a cost and performance evaluation of the candidate secondary sites may be performed. According to one embodiment, a combination of tests are performed against the various registered cloud end points (e.g., those registered in the setup phase) to identify the respective characteristics and/or capabilities (e.g., in terms of possible RPO/RTO values achievable) of these candidate secondary sites. Non-limiting examples of potential tests that may be performed by the local smart agent with respect to the candidate secondary sites include, a latency test (e.g. a ping test), a download speed tests and an upload speed test. A cost of each of the cloud providers may also be obtained, for example, to perform a cost/benefit analysis.

For purposes of providing a concrete and non-limiting example, consider a scenario in which there are four cloud options that are part of the initial secondary site candidate pool. It may be determined based on the latency testing that only three of the cloud options are capable of meeting the RPO needs of the application. Further, when the RTO needs of the application are evaluated, it may be that only two of the cloud providers qualify. Finally, based on a cost comparison between the final two candidate secondary sites, the lower cost option may be selected as the secondary site for application failover.

At block 550, an application profile is registered with the remote DR smart agent running in the selected secondary site. According to one embodiment, after a cloud (e.g., cloud 120) has been selected in block 540 as the selected secondary site for application failover, the profile for a given workload/solution is transferred and registered with the remote DR smart agent (e.g., DR smart agent 125) running in the selected secondary site. The remote DR smart agent may store the profile in the remote policy database (e.g., policy database 126). In this manner, in the event of a failover to the selected secondary site, an instance of the application (e.g., application 127) can be brought up in accordance with the application profile stored in the remote policy database.

Figure 6:
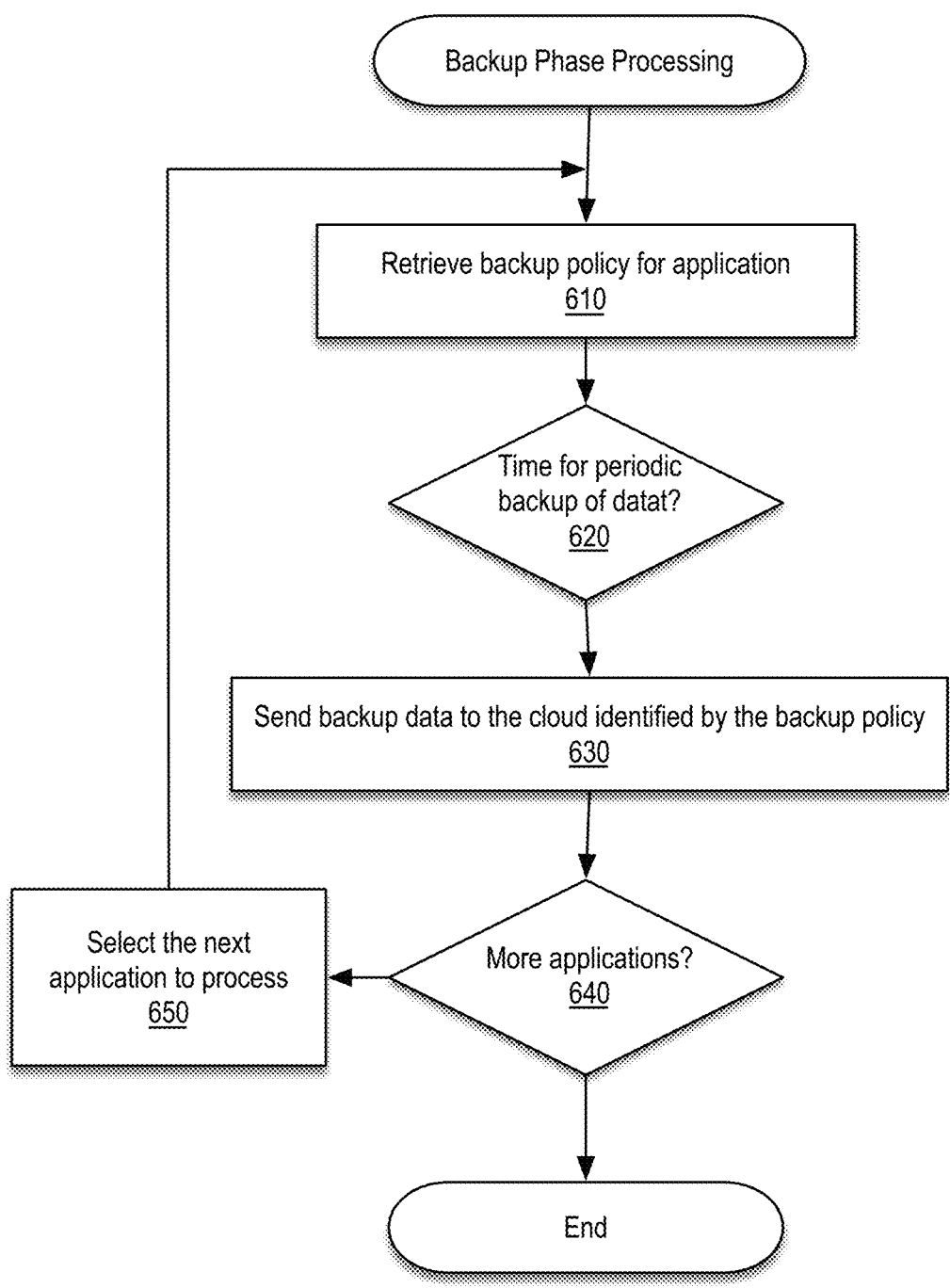
FIG. 6 is a flow diagram illustrating backup phase processing in accordance with an example embodiment.

FIG. 6 is a flow diagram illustrating backup phase processing in accordance with an embodiment. According to one embodiment, one or more portions of the backup phase processing is performed by a local DR smart agent (e.g., DR smart agent 115) running within the primary site (e.g., edge 110). At block 610, the backup policy for a current application (e.g., application 117) of potentially multiple applications running at the primary site is retrieved from the local policy database (e.g., policy database 116). For example, in one embodiment, the application ID can be used to retrieve the corresponding backup policy.

At decision block 620, based on a data transfer frequency associated with the backup policy a determination is made regarding whether it is time to perform a periodic backup for the current application. If so, then processing continues with block 630; otherwise, processing branches to decision block 640.

At block 630, backup data for the application is sent to the cloud identified within the backup policy. According to one embodiment, the application data is be transferred efficiently over a replication fabric (e.g., workload-aware data replication fabric 130) connecting the primary site and the selected secondary site in communication. In this manner, the replication fabric is utilized in an intelligent manner consistent with the data replication needs of the application and that provides better utilization of replication link. In one embodiment, use of an application-specific backup policy also addresses the application RPO in the event of a disaster.

At decision block 640, it is determined whether there are more applications to process. For example, the local smart DR agent may traverse a list or array of application UUIDs representing those applications running in the primary site. If there are additional applications, processing continues with block 650; otherwise, backup phase processing is complete.

At block 650, the next application is selected and processing loops back to block 610.

Figure 7:
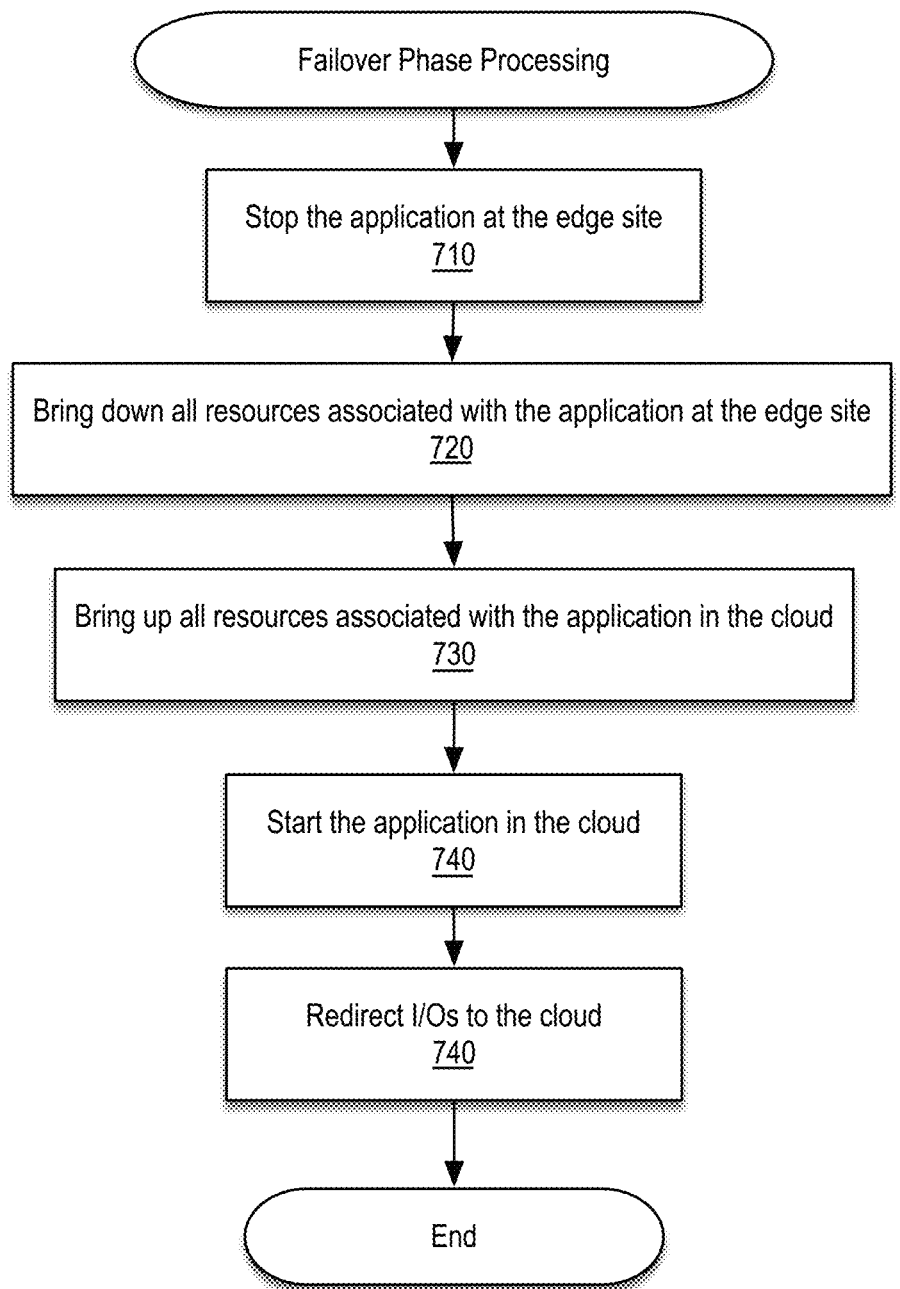
FIG. 7 is a flow diagram illustrating failover phase processing in accordance with an example embodiment.

FIG. 7 is a flow diagram illustrating failover phase processing in accordance with an embodiment. At block 710, a failover event has been trigged manually or by automated means. For example, an IT administrator may declare a disaster through a one touch manual input or an auto trigger may be received as a result of data from sensors (e.g., via the sensor analytics engine 112) at the primary site (e.g., edge 110). According to one embodiment, the DR system (e.g., DR system 100) responds by stopping the application (e.g., application 117) at the edge site if the application is still running.

At block 720, all resources associated with the application at the edge site are brought down. For example, the local DR smart agent (e.g., DR smart agent 115) may direct local IT infrastructure (e.g., IT infrastructure 118) to release all resources associated with the application.

At block 730, resources associated with the remote instance of the application (e.g., application 127) are brought up. According to one embodiment, the remote DR smart agent (e.g., DR smart agent 125) retrieves the profile for the application at issue and brings up the components (e.g., compute, operating system, storage, networking and the like) for the workload in accordance with the profile and may then bring up the application. As those skilled in the art will appreciate, there may be several actions that happen as part of bringing up each high level resource. For example, as part of storage preparation, a check may be performed to verify the application data has been copied over and has been made available to the application. For sake of brevity, the various startup and verification actions for each type of resource are not described herein. Additionally, the storage volumes (e.g., storage volumes 114) at the primary site may be unmounted and the IP addresses of the storage volumes may be re-addressed to point to the cloud volumes (e.g., cloud volumes 124) in the selected secondary site (e.g., cloud 120).

Depending on the RTO associated with the application, the infrastructure at the secondary site may be brought up differently. In one embodiment, infrastructure can be brought up in a cold, warm or hot state. For example, infrastructure used by an application with a low RTO value can be brought up on the fly, infrastructure used by an application with a mid-range RTO value may be pre-provisioned and flexed up post failover, and infrastructure used by an application with a high RTO may be fully provisioned before failover.

Figure 8:
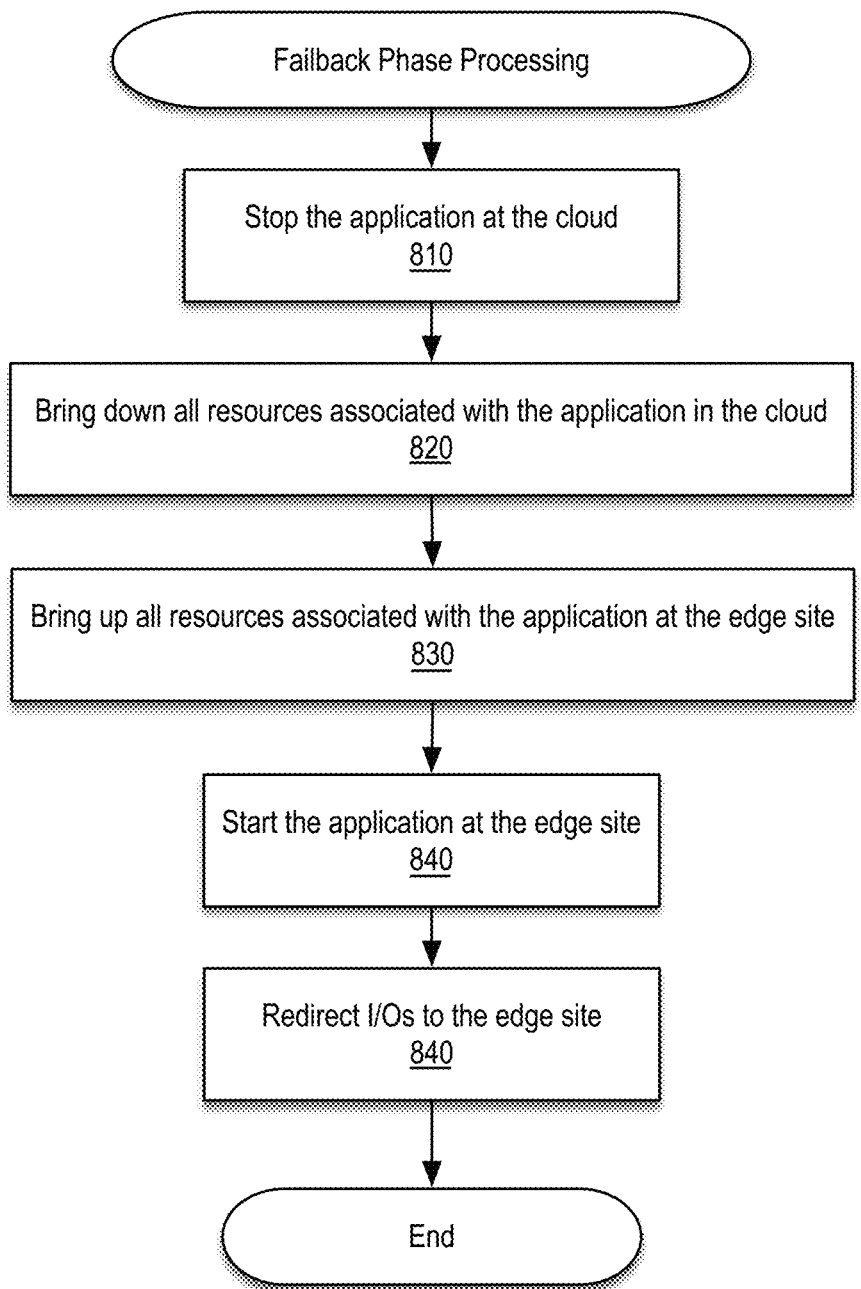
FIG. 8 is a flow diagram illustrating failback processing in accordance with an example embodiment.

FIG. 8 is a flow diagram illustrating failback processing in accordance with an embodiment. At block 810, a failback event has been trigged manually or by automated means. For example, an IT administrator may inform the DR system that the primary site (e.g., edge 110) is back online or an auto trigger may be received as a result detecting the availability of the primary site. According to one embodiment, the DR system (e.g., DR system 100) responds by stopping the application (e.g., application 127) at the secondary site (e.g., cloud 120). In one embodiment, the failback processing verifies the latest data from the secondary site has been updated at the newly restored primary site. In general, direction of data replication is reversed; and a smooth handover is made from the secondary site to the primary site. For example, the VMs supporting the application are restarted and eventually all the workloads are migrated back to the primary site. Furthermore, the resources that were provisioned at the secondary site are released based on the RTO associated with the workload.

At block 820, resources associated with the application at the secondary site are brought down.

At block 830, resources associated with the local instance of the application (e.g., application 117) are brought up. According to one embodiment, the local DR smart agent (e.g., DR smart agent 115) retrieves the profile for the application at issue and brings up the components (e.g., compute, operating system, storage, networking and the like) for the workload in accordance with the profile and may then bring up the application.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 9:
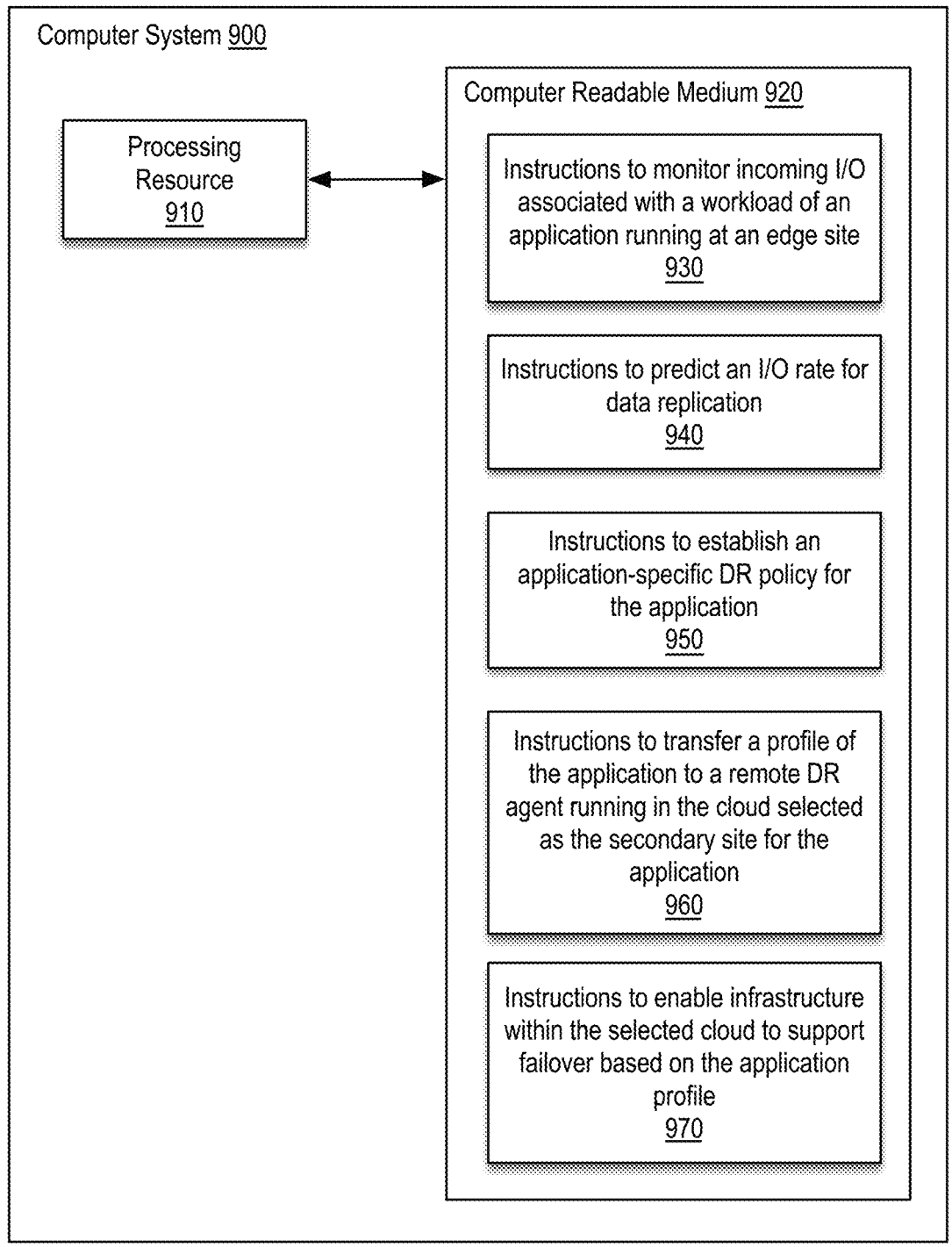
FIG. 9 is a block diagram of a computer system in accordance with an example embodiment.

FIG. 9 is a block diagram of a computer system in accordance with an embodiment. In the example illustrated by FIG. 9, computer system 900 includes a processing resource 910 coupled to a non-transitory, machine readable medium 920 encoded with instructions to perform a proactive auto-scaling method in accordance with a private cloud embodiment. The processing resource 910 may include a microcontroller, a microprocessor, central processing unit core(s), an ASIC, an FPGA, and/or other hardware device suitable for retrieval and/or execution of instructions from the machine readable medium 920 to perform the functions related to various examples described herein. Additionally or alternatively, the processing resource 910 may include electronic circuitry for performing the functionality of the instructions described herein.

The machine readable medium 920 may be any medium suitable for storing executable instructions. Non-limiting examples of machine readable medium 920 include RAM, ROM, EEPROM, flash memory, a hard disk drive, an optical disc, or the like. The machine readable medium 920 may be disposed within the computer system 900, as shown in FIG. 9, in which case the executable instructions may be deemed "installed" or "embedded" on the computer system 900. Alternatively, the machine readable medium 920 may be a portable (e.g., external) storage medium, and may be part of an "installation package." The instructions stored on the machine readable medium 920 may be useful for implementing at least part of the methods described herein.

In the context of the present example, the machine readable medium 920 is encoded with a set of executable instructions 930-970. It should be understood that part or all of the executable instructions and/or electronic circuits included within one block may, in alternate implementations, be included in a different block shown in the figures or in a different block not shown.

Instructions 930, upon execution, cause the processing resource 910 to monitor incoming I/O associated with a workload of an application running at an edge site. In one embodiment, instructions 930 may correspond generally to instructions for performing block 310 of FIG. 3.

Instructions 940, upon execution, cause the processing resource 910 to predict an I/O rate for data replication. In one embodiment, instructions 940 may correspond generally to instructions for performing block 320 of FIG. 3.

Instructions 950, upon execution, cause the processing resource 910 to establish an application-specific DR policy for the application. In one embodiment, instructions 950 may correspond generally to instructions for performing block 330 of FIG. 3.

Instructions 960, upon execution, cause the processing resource 910 to transfer a profile of the application to a remote DR agent running in the cloud selected as the secondary site for the application. In one embodiment, instructions 960 may correspond generally to instructions for performing block 340 of FIG. 3.

Instructions 970, upon execution, cause the processing resource 910 to enable infrastructure within the selected cloud to support failover based on the application profile. In one embodiment, instructions 960 may correspond generally to instructions for performing block 350 of FIG. 3.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
after an application is operational within a virtualized environment of an edge site, performing, by a local disaster recovery (DR) agent, a discovery phase, including:
monitoring incoming Input/Output (I/O) associated with a workload of the application;
predicting an I/O rate for data replication that satisfies latency characteristics of the application by performing I/O pattern analysis on the incoming I/O;
storing, within an application-specific policy for the application, information regarding a cloud selected from a plurality of clouds, to serve as a secondary system should the edge site become unavailable, based on results of tests performed against the plurality of clouds that are indicative of respective potential recovery time objective (RTO)/recovery point objective (RPO) values of the plurality of clouds; and
transferring the application-specific policy to a corresponding remote DR agent running in the selected cloud; and
responsive to a failover event, performing a failover phase including enabling infrastructure within a virtualized environment of the selected cloud to support a failover workload for the application based on the application-specific policy.

2. The method of claim 1, wherein the failover event is responsive to sensors or hardware at the edge site.

3. The method of claim 1, wherein the virtualized environment comprises a virtual machine based environment.

4. The method of claim 1, wherein the virtualized environment comprises a container-based environment.

5. The method of claim 1, further comprising prior to the discovery phase, responsive to the application being deployed within the virtualized environment of the edge site, performing by the local DR agent, a setup phase, including:
determining and storing within the application-specific policy information regarding a topology of the application, including a storage volume utilized by the application; and
determining and storing within the application-specific policy a plurality of DR service level agreement (SLA) values for the application, including an RTO and an RPO.

6. The method of claim 5, further comprising:
during the setup phase:
forming an association between the storage volume and the application by assigning a unique tag to the storage volume; and associating a default DR policy with the application; and during the discovery phase:

determining and storing information regarding a storage optimization for the application within the application-specific DR policy; and causing the storage optimization to be performed during write operations to the storage volume by associating the application-specific DR policy with the storage volume.

7. A non-transitory machine readable medium storing instructions executable by a processing resource of a computer system, the non-transitory machine readable medium comprising instructions to:

after an application is operational within a virtualized environment of an edge site, perform, by a local disaster recovery (DR) agent, a discovery phase, including:

monitoring incoming Input/Output (I/O) associated with a workload of the application;

predicting an I/O rate for data replication that satisfies latency characteristics of the application by performing I/O pattern analysis on the incoming I/O;

storing within an application-specific policy for the application information regarding a cloud selected from a plurality of clouds, to serve as a secondary system should the edge site become unavailable, based on results of tests performed against the plurality of clouds that are indicative of respective potential recovery time objective (RTO)/recovery point objective (RPO) values of the plurality of clouds; and transfer the application-specific policy to a corresponding remote DR agent running in the selected cloud; and responsive to a failover event, perform a failover phase including enabling infrastructure within a virtualized environment of the selected cloud to support a failover workload for the application based on the application-specific policy.

8. The non-transitory machine readable medium of claim 7, wherein the failover event is responsive to sensors or hardware at the edge site.

9. The non-transitory machine readable medium of claim 7, wherein the virtualized environment comprises a virtual machine based environment.

10. The non-transitory machine readable medium of claim 7, wherein the virtualized environment comprises a container-based environment.

11. The non-transitory machine readable medium of claim 7, further comprising instructions to prior to the discovery phase and responsive to the application being deployed within the virtualized environment of the edge site, perform by the local DR agent, a setup phase, including:

determining and storing within the application-specific policy information regarding a topology of the application, including a storage volume utilized by the application; and determining and storing within the application-specific policy a plurality of DR service level agreement (SLA) values for the application, including an RTO and an RPO.

12. The non-transitory machine readable medium of claim 7, further comprising instructions to:

during the setup phase:

form an association between the storage volume and the application by assigning a unique tag to the storage volume; and associate a default DR policy with the application; and during the discovery phase:

determine and store information regarding a storage optimization for the application within the application-specific DR policy; and cause the storage optimization to be performed during write operations to the storage volume by associating the application-specific DR policy with the storage volume.

13. The non-transitory machine readable medium of claim 12, wherein the storage optimization comprises data encryption, write coalescing, or data compression.

14. The non-transitory machine readable medium of claim 7, wherein the discovery phase is repeated at regular intervals or repeated responsive to a triggering event.

15. A system comprising:

a processing resource; and a non-transitory computer-readable medium, coupled to the processing resource, having stored therein instructions that when executed by the processing resource cause the processing resource to:

after an application is operational within a virtualized environment of an edge site, perform, by a local disaster recovery (DR) agent, a discovery phase, including:

monitoring incoming Input/Output (I/O) associated with a workload of the application;

predicting an I/O rate for data replication that satisfies latency characteristics of the application by performing I/O pattern analysis on the incoming I/O;

storing within an application-specific policy for the application information regarding a cloud selected from a plurality of clouds, to serve as a secondary system should the edge site become unavailable, based on results of tests performed against the plurality of clouds that are indicative of respective potential recovery time objective (RTO)/recovery point objective (RPO) values of the plurality of clouds; and transfer the application-specific policy to a corresponding remote DR agent running in the selected cloud; and responsive to a failover event, perform a failover phase including enabling infrastructure within a virtualized environment of the selected cloud to support a failover workload for the application based on the application-specific policy.

16. The system of claim 15, wherein the instructions further cause the processing resource to prior to the discovery phase and responsive to the application being deployed within the virtualized environment of the edge site, perform by the local DR agent, a setup phase, including:

determining and storing within the application-specific policy information regarding a topology of the application, including a storage volume utilized by the application; and determining and storing within the application-specific policy a plurality of DR service level agreement (SLA) values for the application, including an RTO and an RPO.

17. The system of claim 16, wherein the instructions further cause the processing resource to:
  during the setup phase:
    form an association between the storage volume and the application by assigning a unique tag to the storage volume; and
    associate a default DR policy with the application; and
  during the discovery phase:
    determine and store information regarding a storage optimization for the application within the application-specific DR policy
    cause the storage optimization to be performed during write operations to the storage volume by associating the application-specific DR policy with the storage volume.

* * * * *